United States Patent [19]

Shichman et al.

[11] 4,081,310
[45] Mar. 28, 1978

[54] BEAD GRIP RING

[75] Inventors: Daniel Shichman, Trumbull, Conn.; Peter E. Percarpio, N. Haledon, N.J.; Sheppard A. Black, Southbury, Conn.

[73] Assignee: Uniroyal, Inc., New York, N.Y.

[21] Appl. No.: 590,180

[22] Filed: Jun. 25, 1975

[51] Int. Cl.² .............................. B29H 17/12
[52] U.S. Cl. .................... 156/398; 156/131; 156/401
[58] Field of Search .............. 156/123 R, 131, 132, 156/133, 394 R, 398, 400–403, 414–420

[56] References Cited

U.S. PATENT DOCUMENTS

| | | | |
|---|---|---|---|
| 2,145,806 | 1/1939 | Schnedarek | 156/419 |
| 3,014,521 | 12/1961 | Barber et al. | 156/403 |
| 3,016,084 | 1/1962 | Niclas et al. | 156/394 |
| 3,053,308 | 9/1962 | Vanzo et al. | 156/132 |
| 3,134,079 | 5/1964 | Giletta et al. | 156/415 |
| 3,265,549 | 8/1966 | Woodhall et al. | 156/132 |
| 3,281,305 | 10/1966 | Nadler et al. | 156/401 |
| 3,434,897 | 3/1969 | Caretta et al. | 156/132 |
| 3,721,600 | 3/1973 | Cantarutti | 156/131 |

FOREIGN PATENT DOCUMENTS 1,284,081  11/1968  Germany ................ 156/394

Primary Examiner—David Klein
Assistant Examiner—John E. Kittle
Attorney, Agent, or Firm—Lawrence E. Sklar

[57] ABSTRACT

A rubber, radially expansible ring in a tire building drum is provided for gripping the bead of a tire carcass. The ring is radially expansible in a continuous, circumferential channel of the drum. The ring has an outer surface suitably shaped for holding the bead of the tire carcass, and a pair of continuous, circumferential pressure sealing flaps extending inwardly from both sides of the ring. The flaps are adapted for sealing engagement with adjacent side members of the circumferential channel, so that the ring may be radially expanded without the use of an inflatable bladder. This abstract is not to be taken either as a complete exposition or as a limitation of the present invention, however, the full nature and extent of the invention being discernible only by reference to and from the entire disclosure.

8 Claims, 6 Drawing Figures

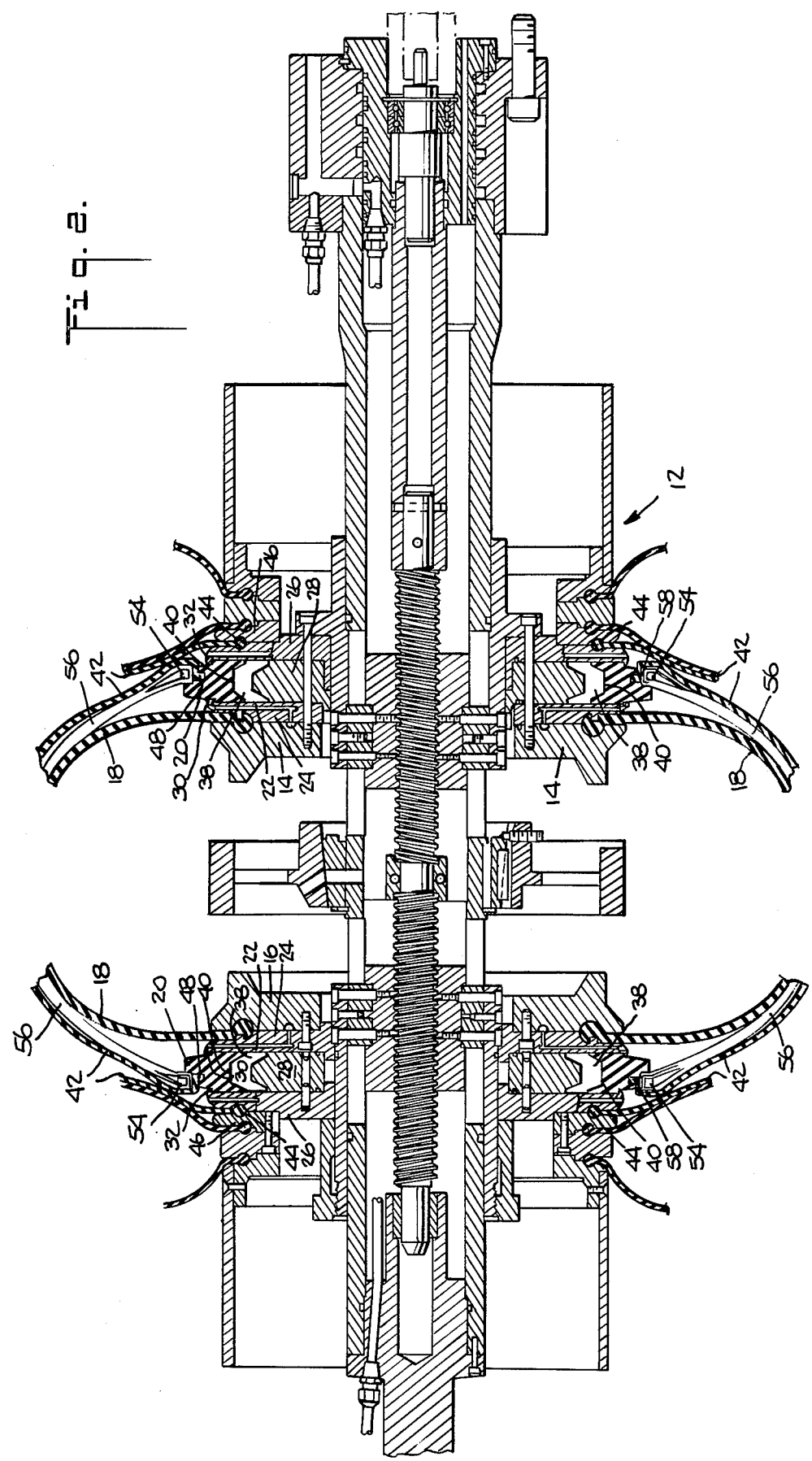

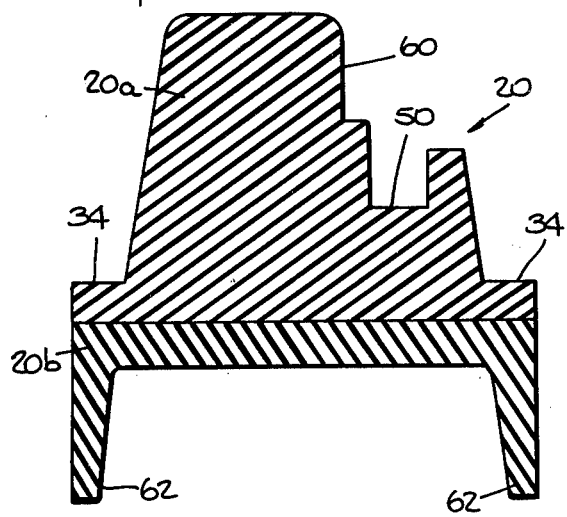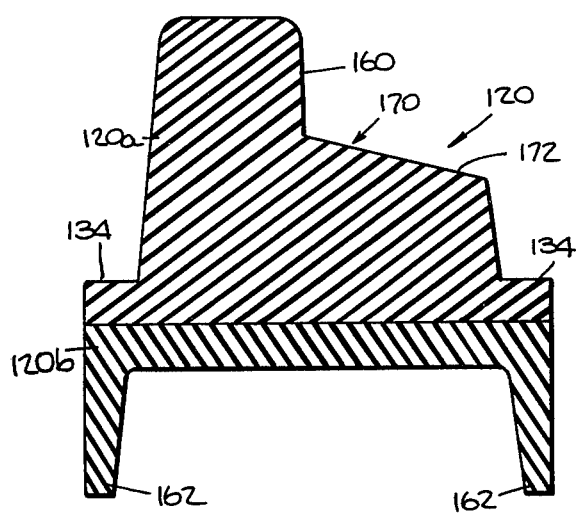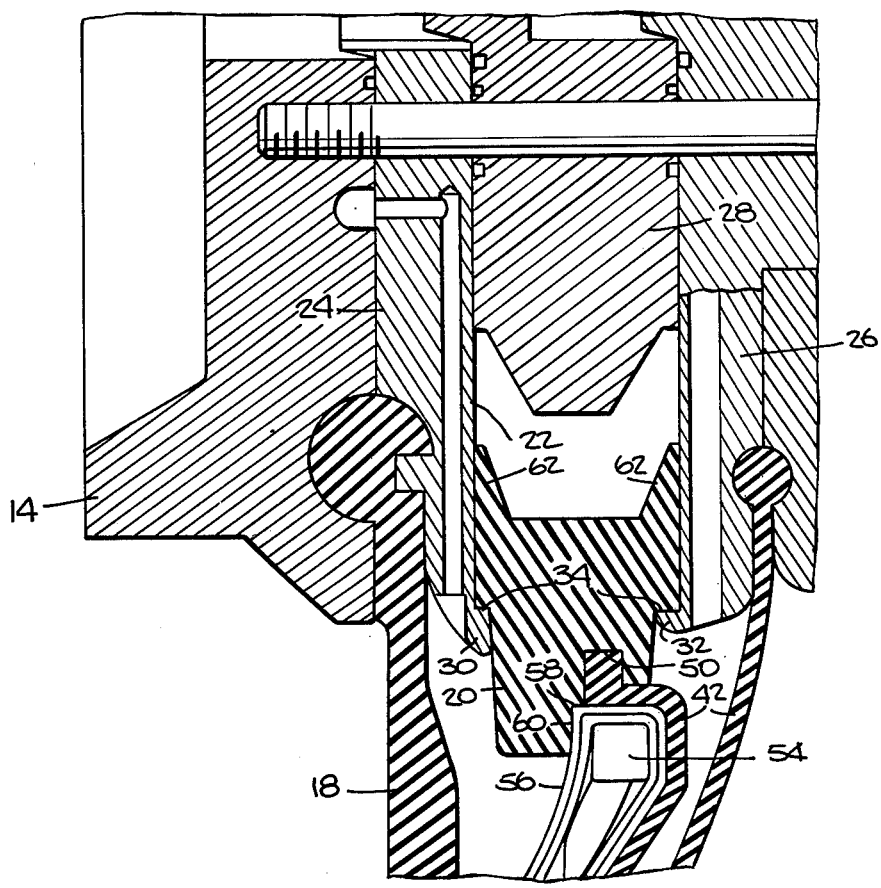

BEAD GRIP RING

BACKGROUND OF THE INVENTION

The present invention relates to a tire building drum of the type having a pair of radially expansible rings for gripping the beads of a tire carcass, and more particularly to such rings which are radially expansible without the use of inflatable bladders. The rings may be used in either a single stage building drum, wherein the tire is both built and expanded into a toroidal shape on one drum, in a first stage drum for building but not expanding a tire carcass, or in a second stage shaping drum wherein a prebuilt tire carcass is expanded to the desired toroidal shape for further processing.

As is known to those skilled in the art, radial ply pneumatic tires are formed in either one or two stage processes. In the one stage process, the tire carcass is both built and expanded to a toroidal shape for breaker and tread application on a single drum, whereas in the two stage process, the tire carcass is formed on one building drum and then expanded to a toroidal shape on a second, shaping drum. In the one stage drum and in the drums of the two stage process for building radial ply tires, and in the drums for building bias ply tires, there is a requirement for a pair of rings to grip and hold the tire beads in position while the tire carcass is being built or while it is being expanded to the desired toroidal shape. The construction and design of these bead grip rings are such that tire beads of a tire carcass can be passed over them onto or off the drum when the bead grip rings are in the unexpanded, retracted position.

The concept of an extensible gripping means to support a tire bead is not novel. It is well known to use a series of metallic fingers, or sections, which expand and contract radially. One such method of expansion of the bead grip means is described in U.S. Pat. No. 3,489,634, issued to T. D. Pizzo et al. on Jan. 13, 1970 and assigned to the assignee of the present invention. Although this type of radially extensible bead gripping means is suitable for manufacture of bias ply tires, it does present aspects which could be improved for the manufacture of tires in general, for the reasons that the extensible, metallic segments or fingers are expensive, complex and require precisely machined components. Further, since the metallic segments or fingers comprise the periphery of the bead grip means, the outer radial edges must conform to a perfect circle when used to produce a tire of a specific bead diameter. If a tire of a different bead diameter were to be built, either a compromise in the radial segments would be necessary or the multi-segmented bead grip ring would have to be changed. Unless perfect matching between tire bead and grippers were obtained, local stresses would develop in the cord plies of the carcass. Still further, after extension of the bead grip, the segments or fingers separate and cause gaps in the circumference of the gripping rings. Since the carcass cords are displaced in a radial direction, the intermittent grip of the segment and the gap between them will cause uneven tension in the cords of the carcass along the periphery of the bead during the carcass shaping process. Also, the spaces between segments would be difficult to seal, were it desirable to retain air within the carcass when positioned on the bead grips.

Rubber-like extensible bead grip rings are also well known. They obviate the problems of the metallic segments or fingers, but they create new operational problems. The force for extending the rubber rings is generally provided by a rubber-like bladder or tube located in an annular space immediately under the extensible rubber rings. Since these rubber-like bladders are placed in a confined and restricted area, repeated expansion and contraction of the bladder generates frictional forces along the walls of the annular space which abrade and distort the bladder, thereby causing premature failure of the bladder.

SUMMARY OF THE INVENTION

It is therefore an object of the instant invention to provide an extensible bead grip ring whose lateral, vertical members create an air-seal against the circumferential channel in which it is retracted and extended to eliminate the need for an inflatable bladder to force the extension of the ring. To this end, the instant invention provides, in a tire building drum, a rubber, radially expansible ring for gripping the bead of a tire carcass, said ring being radially expansible in a circumferential channel of the drum and having an outer surface suitably shaped for holding said bead of said tire carcass, and a pair of continuous, circumferential pressure sealing flaps extending inwardly from both sides of the ring, wherein said flaps are adapted for sealing engagement with adjacent side members of the circumferential channel, whereby the ring may be radially expanded without the use of an inflatable bladder.

BRIEF DESCRIPTION OF THE DRAWINGS

FIG. 2 is similar to FIG. 1 except that it also shows a green tire carcass mounted on the building drum and the bead gripping rings in an expanded position.

FIG. 3 is an enlarged, cross-sectional view of a portion of the bead gripping ring shown on the right side in FIGS. 1 and 2.

FIG. 4 is an enlarged, cross-sectional view of an alternative embodiment of a bead gripping ring.

FIG. 5 is an enlarged view of the area adjacent the lower segment of the right side bead grip ring shown in FIG. 2.

DESCRIPTION OF THE PREFERRED EMBODIMENT

In the following specification and claims, the term "rubber" is understood to mean rubber or rubber-like, and includes rubbery plastic materials.

Figure 1:
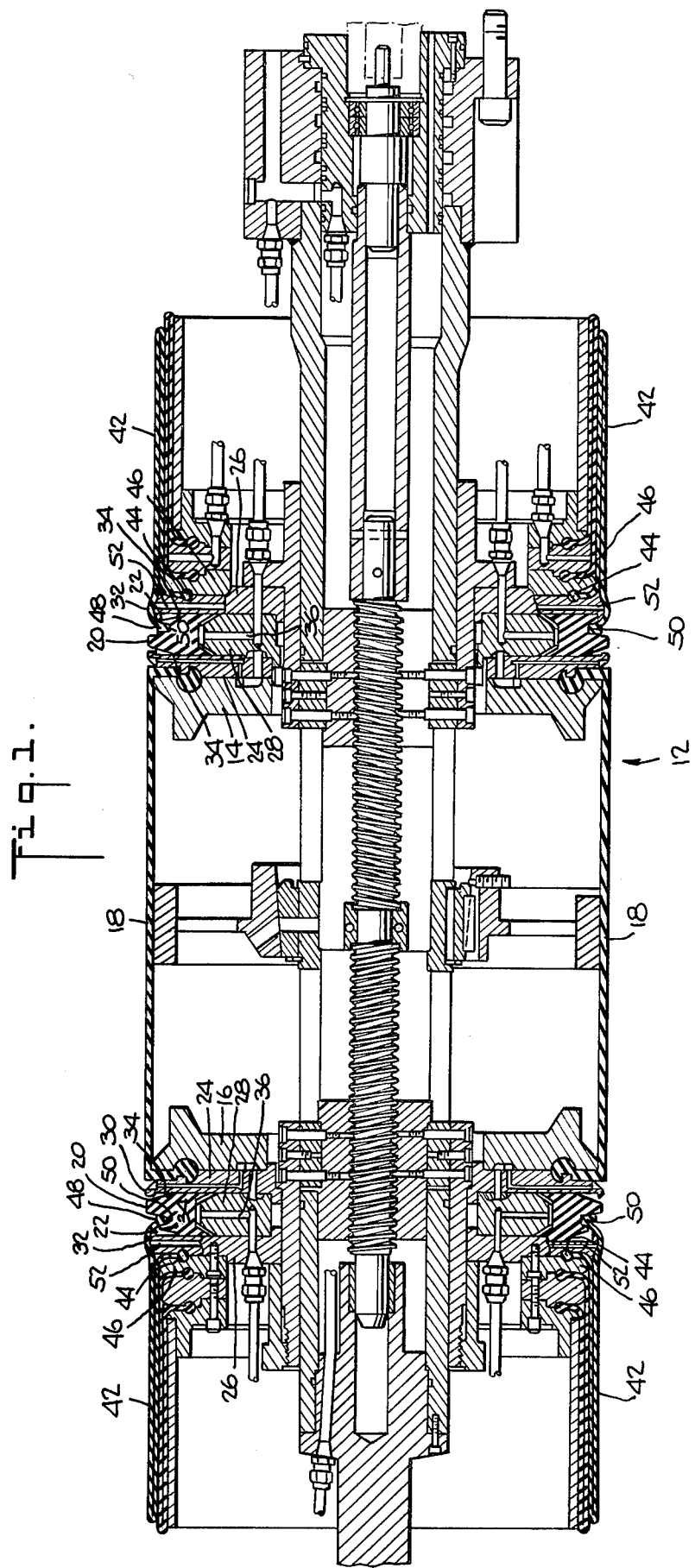
FIG. 1 is a longitudinal, central sectional view of a single stage building drum showing the bead gripping rings in a retracted position.

In describing the preferred embodiment of the instant invention, reference is made to the drawings, wherein FIGS. 1 and 2 depict a single stage building drum generally designated 12 comprising a pair of co-axial, cylindrical end plates 14 and 16. A flexible, inflatable cylindrical diaphragm 18 is attached at its ends to the end plates 14 and 16, one end to each end plate. A pair of coaxial bead gripping rings 20 are shown, in FIG. 1, in a retracted position in a pair of circumferential channels 22, each of which is defined by side members 24 and 26 and a bottom section 28. Side members 24 and 26 have respectively retaining and pressure sealing lips 30 and 32 for engaging the shoulders 34 of the bead gripping rings 20 and controlling the extent of their outward travel in an expanded position, as shown in FIG. 2. Thus, the engagement of the sealing lips 30 and 32 with the shoulders 34 provides improved centering of the tire bead 54 with respect to to the axis of the drum 12. The bottom section 28 of each of the channels 22 has an air inlet passage 36 for admitting high pressure air into the cavity 38 formed by the interior surface 40 (see FIG. 2) of the ring 20 and the bottom portion 28 and side members 24 and 26 of the channel 22.

Each of a pair of sidewall turnup bladders 42 has an edge 44 clamped in position between its adjacent side member 26 of the channel 22 and an adjacent clamping member 46. The other edge 48 of the bladders 42 is held in position in a deep groove 50 of the ring 20 (see FIG. 3). A pair of high pressure air passages 52 run through side members 26 into the interior of the bladders 42 for admitting high pressure air into the bladders 42.

Referring now to FIGS., 2 and 5, a pair of beads 54 of a green tire carcass 56 are shown held in position by continuous, circumferential slots 58 formed by the lateral planar surfaces 60 (see also FIG. 3) of the expanded rings 20 and the expanded bladders 42. The rings 20 are moved to their expanded position in the channels 22 by admission of high pressure air into the cavities 38. Escape of air from the cavities 38 is prevented by pairs of pressure sealing flaps 62 extending inwardly from beneath both shoulders 34 of the ring 20 (see also FIG. 3) which provide increased air sealing as pressure of the air in the cavities 38 increases and, as a back-up, by the sealing lips 30 and 32. The bladders 42 are expanded to turn up the outer edges of the carcass 56 by admission of high pressure air into the bladders by way of the air passages 52.

Figure 6:
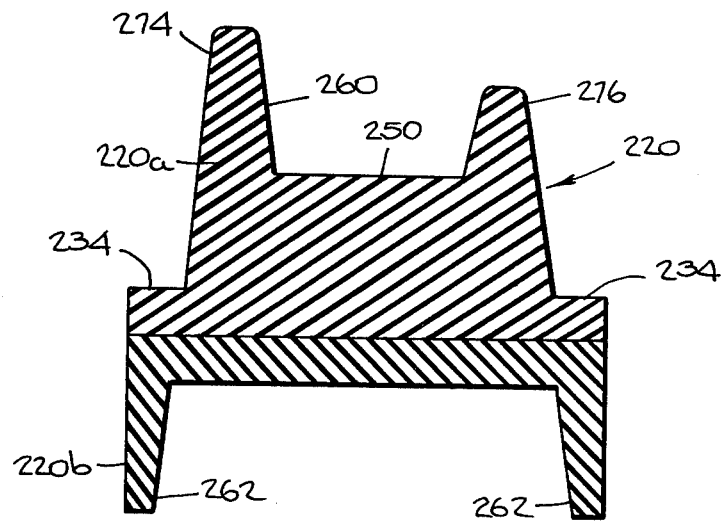
FIG. 6 is an enlarged, cross-sectional view of a third embodiment of a bead gripping ring.

For those applications using no turn-up bladders, such as a second stage shaping drum or where the turn up is otherwise terminated, an alternative embodiment would be used. In this alternative embodiment of a bead gripping ring 120, shown in FIG. 4, the outer surface of the ring 120 is provided with a slot 170 formed by the lateral planar surface 160 and an adjacent inclined surface 172 forming an obtuse angle with the lateral planar surface 160. The slot 170 is able to grip a tire bead without the assistance of a turn-up bladder. This ring 120 would function in the same manner as the ring 20 shown in FIG. 3 but would be used for only the second stage shaping of a prebuilt tire carcass. In FIG. 6 is seen a third embodiment, also for those applications using no turn-up bladders, which is similar to the embodiment shown in FIG. 4, except that in FIG. 6, the bead grip ring 220 is characterized by a long flange 274 and a short flange 276, said flanges being separated by a wide groove 250. The flange 274 and 276 provide bi-directional axial restraint on the tire bead so that the axial position of the beads is under very strict control.

As best seen in FIGS. 3, 4 and 6, the bead grip rings 20, 120 and 220, respectively, are divided into outer and inner segments, the outer segment being indicated by 20a, 120a and 220a, and the inner segment, comprising the pressure sealing flaps 62, 162 and 262, by 20b, 120b and 220b, so that the ring 20 has outer segment 20a and inner segment 20b, the ring 120 has outer segment 120a and inner segment 120b, and the ring 220 has outer segment 220a and inner segment 220b. The outer segments designated "a" comprise a harder rubber for contact with the tire which preferably has a reading on a Shore A durometer between about 75 and 80, while the inner segments "b" comprise a softer rubber for sealing against the side members 24 and 26 and preferably has a reading of between about 60 and 65 on a Shore A durometer. Preferred rubbers for the "a" and "b" segments have the following compositions:

| Material | Parts by Weight |
|---|---|
| "a" segment | |
| Neoprene GRT | 87.5 |
| Neoprene FB | 12.5 |
| Carbon black | 60 |
| Neozone A | 2 |
| Stearic Acid | 0.5 |
| Magnesium Oxide | 7 |
| 2,2'-Benzothiazyl disulfide | 0.5 |
| Polymel #7 | 8 |
| Zinc Oxide | 2.5 |
| "b" segment | |
| Neoprene GRT | 100 |
| Carbon black | 50 |
| Neozone A (N-phenyl-alpha-naphthylamine) | 1 |
| Magnesium Oxide | 5 |
| Aromatic Resin | 5.3 |
| Aromatic hydro-carbon oil | 20 |
| Zinc Oxide | 4 |

Neoprene GRT is a polymer of 2-chlorobutadiene 1,3 manufactured by duPont Company Neoprene FB is a low molecular weight polymer of 2-chlorobutadiene 1,3 manufactured by duPont Company and functions as a plasticizer.

Neozone A is N-phenyl-alpha-naphthylamine manufactured by duPont Company and functions as an antioxidant.

Polymel #7 is a low molecular weight polyethylene having a specific gravity of 0.93 manufactured by Polymel Corporation. Its presence in the compound provides for improved mold release after cure.

The aromatic hydrocarbon oil used in the "b" segment is Sundex 790, manufactured by Sun Oil Company, which has a specific gravity of 0.9806, a flash point of 435° F. and an aniline point of 116° F.

The aromatic resin is Picco AP25 Resin manufactured by Harwick Standard Chemical Company and having a specific gravity of 0.97–1.03.

Although the preferred rubbers are those which are oil resistant, such as Neoprene, butadiene-acrylonitrile polymers and chlorosulfonated polyethylene (Hypalon), other rubbers can be used in the present invention, e.g. unsaturated hydrocarbon polymers exemplified by the diene polymers such as polybutadiene or polyisoprene; copolymer rubbers such as butadiene-styrene or butyl; natural polymers such as balata, Hevea rubber and the like. Other unsaturated hydrocarbon polymers which may be used are the rubbery interpolymers of at least two alpha-mono olefins and at least one copolymerizable diene such as are disclosed in British Pat. No. 880,904 of Dunlop Rubber Company Oct. 25, 1961, U.S. Pat. Nos. 2,933,480, issued Apr. 19, 1960 to Gresham and Hunt, and 3,000,866, issued Sept. 19, 1961 to Tarney, and Belgian Pat. Nos. 623,698 and 623,741 of Montecatini, Feb. 14, 1963.

The invention disclosed will have many modifications which will be apparent to those skilled in the art in view of the teachings of the specification. It is intended that all modifications which fall within the true spirit and scope of this invention be included within the scope of the appended claims.

What is claimed is:

1. In a tire building drum, a rubber, radially expansible ring for gripping the bead of a tire carcass, said ring being radially expansible in and forming an expansible chamber with a circumferential channel of the drum, said ring having an outer surface which includes a lateral planar surface and an adjacent deep groove adapted to receive one end portion of a sidewall turnup bladder, said outer surface and said one end portion being suitably shaped for holding said bead of said tire carcass, and said ring further having a pair of continuous, circumferential pressure sealing flaps, one of which extends inwardly from each side of the ring, said flaps being constructed and arranged to sealingly engage with adjacent side members of the circumferential channel, whereby the ring may be radially expanded without the use of an inflatable bladder.

2. The ring of claim 1, wherein the pressure sealing flaps comprise a rubber which is softer than the remainder of the ring for sealing engagement with the adjacent side members of the circumferential channel.

3. The ring of claim 1, wherein the pressure sealing flaps have a hardness of between about 60 and 65 on a Shore A durometer.

4. The ring of claim 3, wherein the remainder of the ring has a hardness of between about 75 and 80 on a Shore A durometer.

5. The ring of claim 4, wherein the rubber is oil resistant.

6. The ring of claim 2, wherein a major portion of the rubber comprises 2-chlorobutadiene 1,3.

7. The ring of claim 1, additionally comprising a pair of shoulders situated above the pressure sealing flaps, whereby the bead of the tire carcass may be centered with respect to the axis of the drum.

8. In a tire building drum, a rubber, radially expansible ring for gripping the bead of a tire carcass, said ring being radially expansible in and forming an expansible chamber with a circumferential channel of the drum, said ring having an outer surface which includes a lateral planar surface and an adjacent deep groove, and in combination therewith one end portion of a sidewall turnup bladder seated within said deep groove, wherein the bead is held in position by the end portion of the sidewall turnup bladder, and said ring further having a pair of continuous, circumferential pressure sealing flaps, one of which extends inwardly from each side of the ring, said flaps being constructed and arranged to sealingly engage with adjacent side members of the circumferential channel, whereby the ring may be radially expanded without the use of an inflatable bladder.

* * * * *